(12) United States Patent
You et al.

(10) Patent No.: US 8,781,113 B2
(45) Date of Patent: Jul. 15, 2014

(54) DECRYPTION APPARATUS AND METHOD OF DECRYPTING CIPHERTEXT OF THE SAME

(75) Inventors: Yong-kuk You, Seoul (KR); Hee-jae Park, Hwaseong-si (JP); Jong-ho Rhee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 13/618,658

(22) Filed: Sep. 14, 2012

(65) Prior Publication Data

US 2013/0136257 A1    May 30, 2013

(30) Foreign Application Priority Data

Nov. 30, 2011    (KR) .................. 10-2011-0126798

(51) Int. Cl.
    *H04L 9/30*        (2006.01)
(52) U.S. Cl.
    USPC .................... 380/30; 380/28; 708/5

(58) Field of Classification Search
    USPC ........................... 380/28, 30; 708/5
    See application file for complete search history.

(56) References Cited

U.S. PATENT DOCUMENTS

| | | | |
|---|---|---|---|
| 2003/0187959 A1* | 10/2003 | Kim et al. ................. | 709/219 |
| 2007/0127721 A1* | 6/2007 | Atallah et al. .............. | 380/277 |
| 2010/0070827 A1* | 3/2010 | Kim et al. ................. | 714/758 |
| 2011/0116625 A1 | 5/2011 | Michiels et al. | |
| 2011/0150213 A1 | 6/2011 | Michiels et al. | |

\* cited by examiner

*Primary Examiner* — Jung Kim
*Assistant Examiner* — Ayoub Alata
(74) *Attorney, Agent, or Firm* — Sughrue Mion, PLLC

(57) ABSTRACT

The method of decrypting a ciphertext includes: pre-storing a plurality of polynomial functions into which a secret key decrypting a ciphertext to a plaintext according to a public-key cryptography algorithm is broken down; receiving the ciphertext generated based on the secret key which is broken down into the plurality of polynomial functions from a ciphertext generating device; and decrypting the received ciphertext into the plaintext based on the pre-stored polynomial functions.

15 Claims, 5 Drawing Sheets

DECRYPTION APPARATUS AND METHOD OF DECRYPTING CIPHERTEXT OF THE SAME

CROSS-REFERENCE TO RELATED APPLICATION

This application claims priority from Korean Patent Application No. 10-2011-0126798, filed on Nov. 30, 2011 in the Korean Intellectual Property Office, the disclosure of which is incorporated herein by reference in its entirety.

BACKGROUND

1. Field

Apparatuses and methods consistent with exemplary embodiments relate to decrypting a ciphertext into a plaintext, and more particularly to improving security of a secret key when performing encryption and decryption of a plaintext.

2. Description of the Related Art

A system including apparatuses which communicate with each other, for example, a server and a client, is widely used in various fields of electronic and communication technologies. For example, in an image processing system, a content providing apparatus that is a server transmits content such as image-data to a content playback device that is a client through a wire-based and/or wireless network, and the content playback device processes and presents the image data as images.

However, as various service models providing content are developed, attacks have been often launched to leak data to an unauthorized third person while transmitting the data. For example, in a communication environment, there could be an interception of data while the data is transmitted from a server to a client, or malicious programs could be embedded in a client to decode a data code.

Thus, data cryptography has been suggested in order to prevent illegal access to content and to protect the copyright on content. For example, a black-box cryptography uses a cryptographic algorithm embedded in separate hardware which an attacker cannot identify. However, the black-box cryptography may involve costs of hardware use, installation issues, difficulty of updating/patch when internal defects occur, etc. On the other hand, a white-box cryptography employs software for protecting a secret key.

However, when an attack happens on a client by memory dumb, the white-box cryptography may allow data to be decoded through the analysis of codes in the memory. Thus, in white-box cryptography, the data needs to be encrypted in a way that it cannot to be decoded by a white-box attack.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a method of a decryption apparatus decrypting a ciphertext, the method including: pre-storing a plurality of preset polynomial functions into which a secret key decrypting a ciphertext to a plaintext according to a preset public-key cryptography algorithm is broken down; receiving the ciphertext generated based on the secret key which is broken down into the plurality of polynomial functions from a ciphertext generating device; and decrypting the received ciphertext into the plaintext based on the pre-stored polynomial functions.

The received ciphertext into the plaintext based on the pre-stored polynomial functions may include multiplying the polynomial functions and decrypting the ciphertext into the plaintext based on the multiplied polynomial functions.

An element selected at random may be added to each of the polynomial functions broken down in the ciphertext generating device, and the added elements to each of the polynomial functions may be determined such that the elements are offset by multiplication of the broken down polynomial functions in the decryption apparatus to thereby calculate an identity element.

The polynomial functions broken down in the ciphertext generating device may be broken down to the polynomial functions having a preset constant.

The public-key cryptography algorithm may conform a Rivest-Shamir-Adleman (RSA) or Elliptic Curve Cryptosystem (ECC) system.

According to another aspect of an exemplary embodiment, there is provided a decryption apparatus decrypting a ciphertext including: a communication unit which communicates with a ciphertext generating device; and a processor which pre-stores a plurality of preset polynomial functions into which a secret key decrypting a ciphertext to a plaintext according to a preset public-key cryptography algorithm is broken down, and decrypts the ciphertext into the plaintext based on the pre-stored polynomial functions when receiving the ciphertext generated based on the secret key which is broken down into the plurality of polynomial functions from a ciphertext generating device through the communication unit.

The processor may multiply the polynomial functions and decrypt the ciphertext into the plaintext based on the multiplied polynomial functions.

An element selected at random may be added to each of the polynomial functions broken down in the ciphertext generating device, and the added elements to each of the polynomial functions may be determined such that the elements are offset by multiplication of the broken down polynomial functions in the decryption apparatus to thereby calculate an identity element.

The polynomial functions broken down in the ciphertext generating device may be broken down to the polynomial functions having a preset constant.

The public-key cryptography algorithm may conform to an RSA or ECC system.

The ciphertext generating device may include a server, and the decryption apparatus may include an image processor communicating with the server.

BRIEF DESCRIPTION OF THE DRAWINGS

The above and/or other aspects will become more apparent by describing certain exemplary embodiments, with reference to the accompanying drawings, in which.

DETAILED DESCRIPTION OF EXEMPLARY EMBODIMENTS

Figure 1:
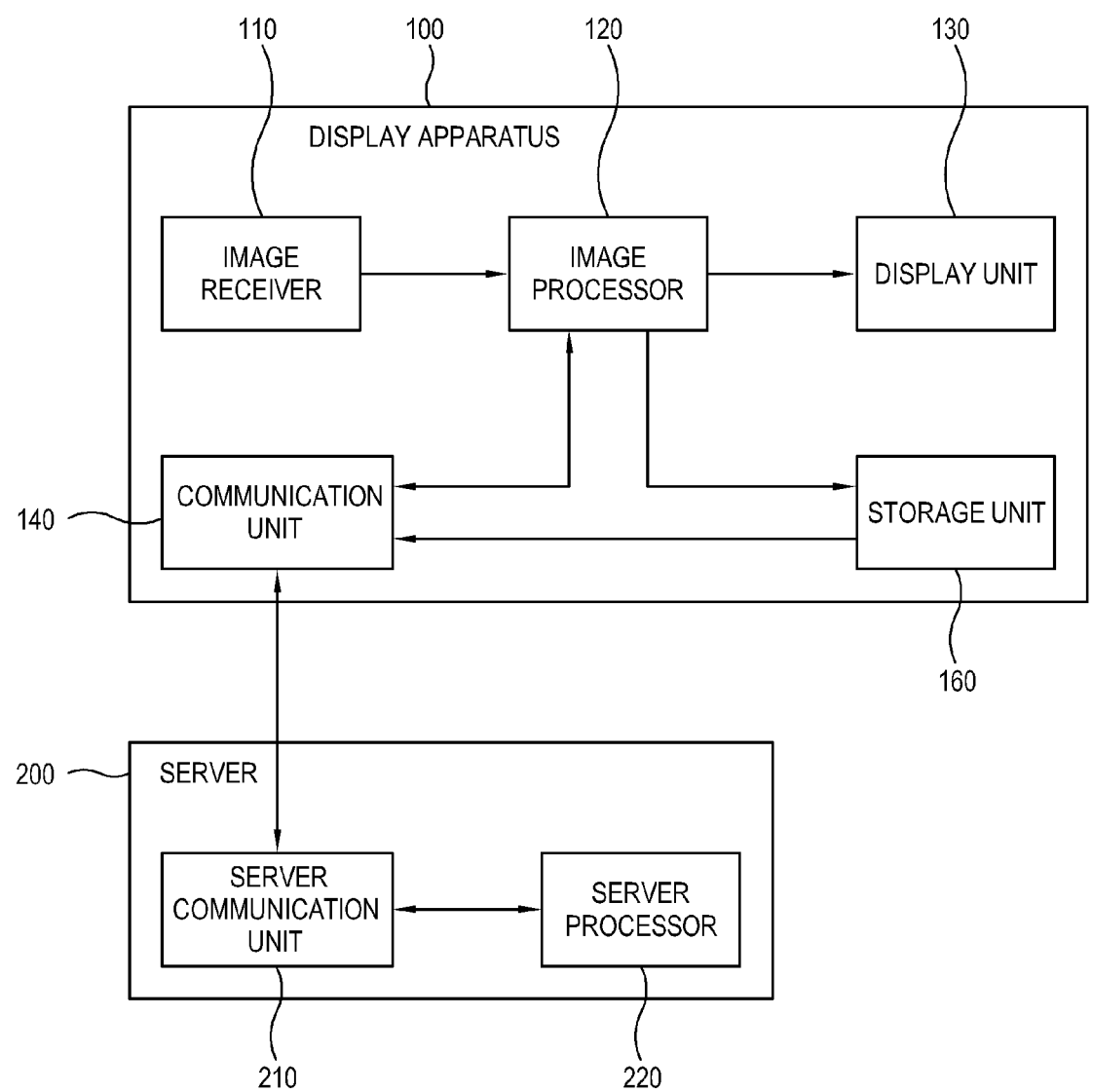
FIG. 1 is a block diagram illustrating a configuration of an encrypting and decrypting system according to an exemplary embodiment.

Certain exemplary embodiments are described in detail below with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. However, exemplary embodiments can be carried out without those specifically defined matters. Also, well-known functions or constructions are not described in detail since they would obscure the exemplary embodiments with unnecessary detail.

The exemplary embodiments may be embodied in various forms without being limited to the exemplary embodiments set forth herein. FIG. 1 is a block diagram illustrating a configuration of an encrypting and decrypting system according to an exemplary embodiment.

The system according to an exemplary embodiment includes a server which serves as a ciphertext generating device that encrypts a plaintext into a ciphertext and a client which serves as a decrypting device that receives a ciphertext generated by the ciphertext generating device and decrypts the ciphertext back into a plaintext.

Further, the client according to an exemplary embodiment includes an image processing apparatus which processes image signals or image data, such as a desktop or a set-top box, or as a display apparatus which displays images, such as a TV, a portable multimedia player or a mobile phone.

However, the above examples are only illustrative, and the server or the client may be configured as various forms of electronic apparatuses which are capable of encrypting and decrypting plaintext.

As shown in FIG. 1, a display apparatus 100 according to an exemplary embodiment is configured as a device which is capable of displaying images based on image signals/image data and receiving data from the outside. The display apparatus 100 includes an image receiver 110 receiving image signals from an external image source (not shown), an image processor 120 processing image signals received by the image receiver 110 according to image processing processes, a display unit 130 displaying images based on image signals processed by the image processor 120, and a communication unit 140 communicating with the server 200 and transmitting and receiving unrestricted signals/data/information to and from the server 200.

Meanwhile, the server 200 includes a server communication unit 210 communicating with the display apparatus 100 and a server processor 220 controlling various operations of the server 200.

Hereinafter, each component included in the display apparatus 100 is described.

The image receiver 110 receives image signals from external image sources (not shown) wirelessly and/or through wires or cables and transmits the signals to the image processor 120. The image receiver 110 may be configured in various forms corresponding to standards of received image signals and types of the display apparatus 100. For example, when the display apparatus 100 includes a TV, the image receiver 110 may receive radio frequency (RF) signals transmitted from broadcasting stations (not shown) or various image signals according to composite/component video, super video, SCART, high definition multimedia interface (HDMI), DisplayPort, unified display interface (UDI) or wireless HD standards. When an image signal is a broadcast signal, the image receiver 110 includes a tuner to tune the broadcast signal by each channel.

Alternatively, when the display apparatus 100 includes a portable multimedia player or mobile phone, the display apparatus 100 may transmit an image data packet to the image processor 120 through the communication unit 140 instead of the separate image receiver 110 receiving image signals.

The image processor 120 performs various image processing processes on image signals received from the image receiver 110. The image processor 120 outputs processed image signals to the display unit 130, so that images based on the corresponding image signals are displayed on the display unit 130.

The image processor 120 may perform, without being limited to, for example, decoding corresponding to an image format of an image signal, de-interlacing to convert an interlaced image signal into a progressive form, scaling to adjust an image signal to a preset resolution, noise reduction to improve image quality, detail enhancement, frame refresh rate conversion, or the like.

In addition to the foregoing image processing processes, the image processor 120 may process data received from the server 200 according to characteristics of the data. For example, the image processor 120 may download and execute a particular application from the server 200 or display a webpage provided by the server 200.

The image processor 120 may be provided as an integrated multi-functional component, such as a system on chip (SOC), or as an image processing board (not shown) formed by mounting separate components which independently conduct individual processes on a printed circuit board.

The display unit 130 displays images based on image signals output from the image processor 120. The display unit 130 may be configured in various display modes using liquid crystals, plasma, light emitting diodes, organic light emitting diodes, a surface conduction electron emitter, a carbon nanotube, nano-crystals, or the like, without being limited thereto.

The display unit 130 may further include an additional component depending on its display mode. For example, when the display unit 130 is configured in a display mode using liquid crystals, the display unit 130 includes a liquid display panel (not shown), a backlight unit (not shown) providing light to the display panel and a panel driving board (not shown) driving the panel.

The communication unit 140 is connected to an external network according to a corresponding wire-based or wireless protocol and enables the display apparatus 100 to communicate with the server 200 connected to the same network. The communication unit 140 performs two-way communication so that the image processor 120 transmits and receives data to and from the server 200. That is, the communication unit 140 transmits data stored in a storage unit 160 to the server 200 according to control by the image processor 120, or transmits data received from the server 200 to the image processor 120.

Hereinafter, each component included in the server 200 is described.

The server communication unit 210 transmits and receives various data to and from the display apparatus 100. The server communication unit 210 transmits data received from the display apparatus 100 to the server processor 220 or transmits data transmitted from the server processor 220 to the display apparatus 100. To this end, the server communication unit 210 is connected through a network conforming to a corresponding protocol, corresponding to the communication unit 140.

The server processor 220 performs operations corresponding to data transmitted to the server communication unit 210. For example, when receiving a request for particular data included in the server 200 from the display apparatus 100 through the server communication unit 210, the server processor 220 transmits the data to the display apparatus 100 through the server communication unit 210.

Here, the server processor 220 generates a ciphertext by encrypting data that is plaintext according to an encryption algorithm and transmits the generated ciphertext to the display apparatus 100. The display apparatus 100 decrypts the received ciphertext back to the plaintext, thereby preventing the plaintext from being decoded and intercepted by an unauthorized third person while the plaintext is being transmitted from the server 200 to the display apparatus 100.

As the encryption algorithm, algorithms for public-key cryptosystem, such as an RSA or ECC system, may be employed.

Figure 2:
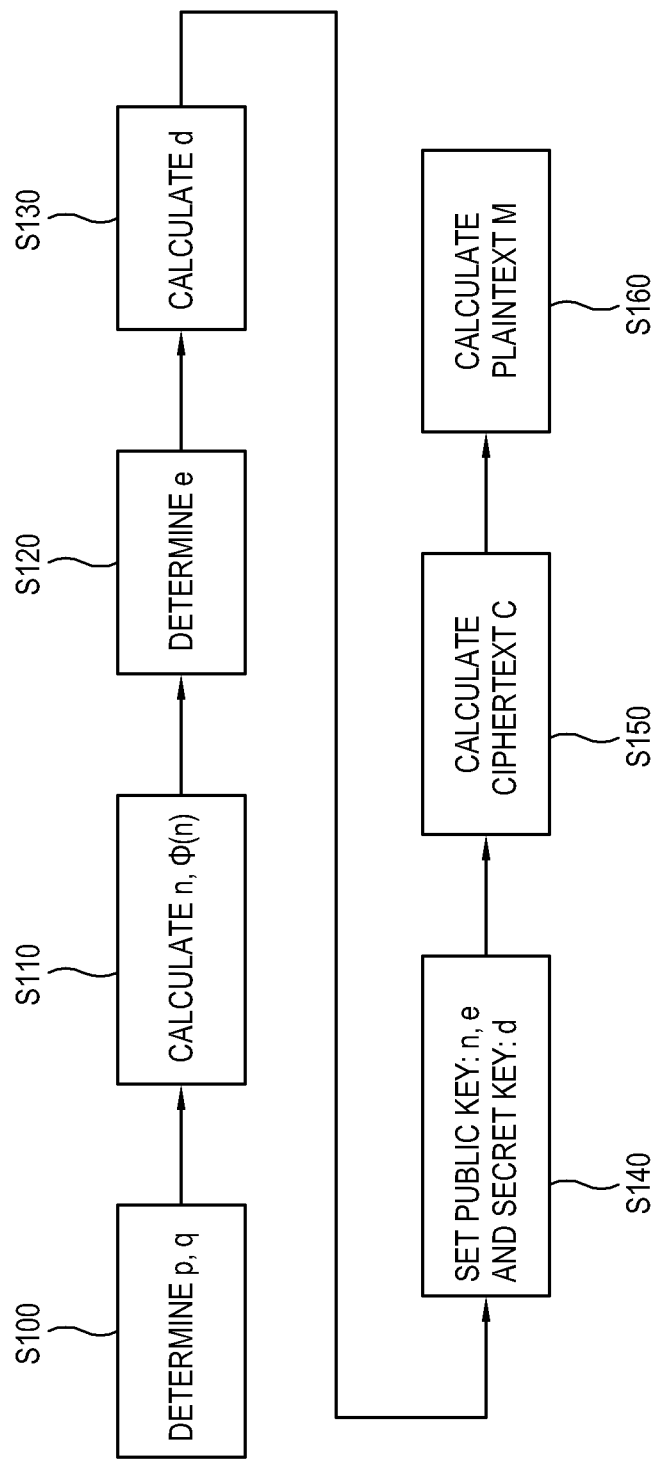
FIG. 2 is a flowchart schematically illustrating a process of encrypting and decrypting data according to RSA algorithm.

Hereinafter, a process of encrypting and decrypting data using RSA system is schematically described with reference to FIG. 2. FIG. 2 is a flowchart illustrating the process.

As shown in FIG. 2, the server 200 encrypts a plaintext M into a ciphertext C and the display apparatus 100 decrypts the ciphertext C into the plaintext M using an algorithm for a public-key cryptosystem, RSA.

Regarding a result obtained by multiplying two prime numbers, it is easy to calculate the result by multiplying the two prime numbers, whereas it is very difficult to deduce two prime numbers which make the result via multiplication from the result. That is, a reverse calculation is mathematically difficult.

RSA, in which factoring is applied to encryption, is an algorithm that is based on the presumed difficulty of factoring large integers. According to the RSA algorithm, a public key is used to encrypt a plaintext and a secret key is used to decrypt a ciphertext.

The public key and the secret key are generated by the following process.

First, sufficiently large prime numbers p and q are selected (S100). The greater p and q are, the more stable the encryption is.

When p and q are determined, an RSA modulus n and Euler's phi function $\Phi(n)$ are calculated (S110). Here, n is obtained by $n=p*q$ and $\Phi(n)$ is calculated by $\Phi(n)=(p-1)(q-1)$.

A value e is chosen at random (S120). Here, $1<e<\Phi(n)$ and e and $\Phi(n)$ are coprime.

As the value e is determined, d is calculated (S130). Here, d is a number which satisfies $e*d=1 \pmod{\Phi(n)}$. Here, mod is a modulus operator.

When n, e and d are determined in this manner, e and n are set as a public key and d is set as a private key/secret key (S140).

The server 200 calculates the ciphertext C with the public key as $C=M^e \mod n$ and transmits the ciphertext to the display apparatus 100 (S150).

When receiving the ciphertext C, the display apparatus 100 decrypts the ciphertext C into the plaintext M with the secret key as $M=C^d \mod n$ (S160).

That is, with the secret key d only, it is possible to decode the ciphertext C since the public key is known. Thus, to protect the plaintext M, it is prudent that the secret key d is not exposed.

Figure 3:
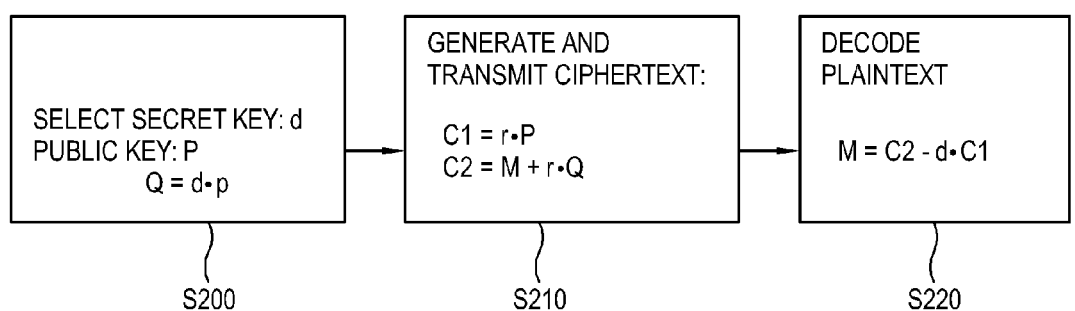
FIG. 3 is a flowchart schematically illustrating a process of encrypting and decrypting data according to ECC algorithm.

An ECC algorithm works in a similar way. The ECC algorithm is an algorithm proposed based on discrete logarithm problems for elliptic curves defined over definite fields. Hereinafter, a process of encrypting and decrypting data using an ECC system is schematically described with reference to FIG. 3. FIG. 3 is a flowchart illustrating the process.

As shown in FIG. 3, a secret key d and public keys P and Q are selected (S200). Here, P is determined to be a coordinate having a larger digit in elliptic curves E(F) over a preset finite field F, Q is determined by $Q=d*P$, and d is a constant chosen at random.

The server 200 generates and transmits two ciphertexts C1 and C2 to the display apparatus 100 (S210). Here, C1 and C2 are calculated by $C1=r*P$ and $C2=M+r*Q$, respectively, and r is an integer chosen at random.

When receiving the ciphertexts C1 and C2, the display apparatus 100 decodes a plaintext M as $M=C2-d*C1$ (S220). That is, in the same manner as RSA, ECC uses the secret key d in decoding the plaintext, and, thus, for security of the plaintext M, the secret key d needs to be protected from being exposed.

However, if a white-box attack is launched on the display apparatus 100 through the analysis of a code in a memory, the secret key may be exposed to an attacker while the display apparatus 100 decrypts the ciphertexts due to characteristics of an algorithm for public-key encryption which protects the code with software only.

Thus, according to an exemplary embodiment, to prevent a secret key from being exposed against a white-box attack while transmitting and decoding the ciphertexts, the following method may be employed. The server 200 breaks down a secret key into a plurality of polynomial functions and transmits a ciphertext generated based on the polynomial functions to the display apparatus 100. The plurality of polynomial functions are pre-stored in the display apparatus 100, and the display apparatus 100 applies the plurality of polynomial functions by multiplication when decrypting the ciphertext, thereby deducing a plaintext without exposing the secret key on a code during decryption.

Accordingly, even if a white-box attack happens while transmitting and decrypting the ciphertext, the plaintext is deduced while the secret key is protected from the attack.

Hereinafter, an exemplary embodiment in which—the RSA algorithm is used is described in detail below. However, the ECC algorithm may also be used in an exemplary embodiment.

As described above, in the decryption using the RSA, the plaintext M is received by operation of $[C^d \mod n]$, where C is a ciphertext, d is a secret key, n is a public key, and an RSA modulus is n.

According to an exemplary embodiment, the server 200 constructs a secret key d by breaking down the secret key into a plurality of polynomial functions so that the secret key is not exposed such that the plaintext M is decrypted as:

$$[C^d \mod n = \Pi(C^{d\_i} + f_i(C)) \mod n], \text{ where } d\_i=d_i \text{ and } \Pi \text{ is a multiplication operator.}$$

Thus, $[\Pi(C^{d\_i} + f_i(C)) = (C^{d_1} + f_1(C)) + (C^{d_2} + f_2(C)) + \ldots + (C^{d_i} + f_i(C))]$.

Also, in order to enhance stability of prevention of the secret key from being exposed, the server 200 adds an element determined at random to each of the polynomial functions. These elements are determined such that they are offset by multiplication of the respective polynomial functions during decryption by the display apparatus 100 to thereby calculate an identity element.

Here, these elements are set to be based on a ciphertext input to the display apparatus 100 in decryption, for example, a hash function of the ciphertext may be employed.

For example, in operation [$C^d$ mod n], a value $r_i$ is selected at random and added to a polynomial function so that $\Pi C^d$ is $\Pi((r_i{}^\wedge C')*C^{d-i})$, where C' is a result obtained by converting C using a hash function.

While the display apparatus 100 deduces a plaintext by calculating [$C^d$ mod n], the value $r_i$ finally becomes an identity element, in this case 1, by multiplication and is offset so as not to affect a final result of the plaintext M.

Figure 4:
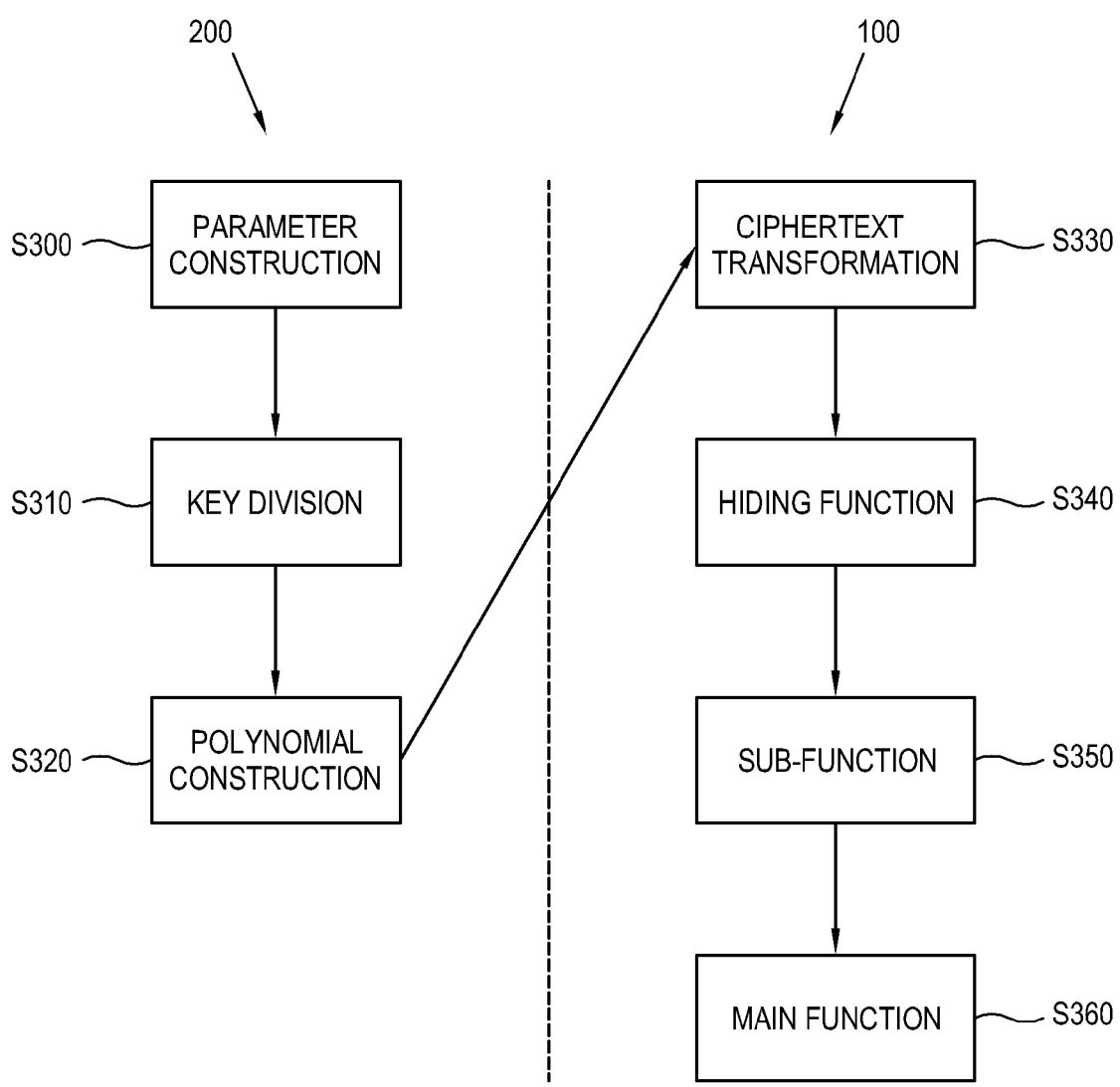
FIG. 4 is a flowchart illustrating encrypting and decrypting processes according to an exemplary embodiment.

Hereinafter, encryption and decryption processes performed by the server 200 and the display apparatus 100 are described in detail with reference to FIG. 4. FIG. 4 is a flowchart illustrating the processes.

Operation names and numbers shown in FIG. 4 are illustrated only for convenience, and these terms do not limit the scope of an exemplary embodiment. Further, employed functions or polynomial equations may have various mathematical forms in design and not be limited as to content, and thus description of specific mathematical content is omitted in this example.

As shown in FIG. 4, at parameter construction operation (S300), the server 200 receives input of a secret key d, an RSA modulus n, prime numbers p and q constituting n, and a number k selected at random to break down the secret key.

Based on these input values, the server 200 deduces an added element Q, determined at random and calculates $d_i$ by applying $Q_i$ to the secret key d.

That is, $d_i$ has a form in which the secret key d is broken down into polynomial functions and the random added value is applied to the functions.

At key division operation (S310), the server 200 modifies the secret key constructed at parameter construction operation (S300).

The server 200 receives input of a new constant w and applies the new constant w to Q, to calculate a function $s_{ij}$, which is a function by i and j, where j is determined by calculation of w and $Q_i$.

Accordingly, at operation S310, a form of Q, to decode the calculated $d_i$ is modified, making decoding substantially infeasible, in a case of the white-box attack.

At polynomial construction operation (S320), the server 200 constructs an environment in which polynomial interpolation is available and outputs a polynomial equation corresponding to an input value.

The server 200 calculates $g_{ijn}$ (C) using C, $Q_i$, $S_{ij}$, n and a hash function of C, C', in order to prevent each polynomial function from being exposed by code analysis in multiplication of the broken-down polynomial functions and to secure security of the secret key.

Meanwhile, at ciphertext transformation operation (S330), the display apparatus 100 calculates C' by applying a ciphertext received from the server 200 to a hash function. Accordingly, fewer operations may be carried out in multiplication of subsequent processes.

At hiding function operation (S340), the display apparatus 100 outputs a polynomial expression needed for exponentiation by polynomial interpolation using a function output at polynomial construction operation (S320) in order to prevent the polynomial functions from being exposed.

For example, the display apparatus 100 converts $gi_j(C)$ into a parameter n-excluded function $f_{ij}(C)$. Accordingly, exposure of a polynomial function by a white-box attack may be prevented.

At sub-function operation (S350), the display apparatus 100 constructs a polynomial function for exponentiation of the secret key, which is broken down into a plurality of polynomial functions.

For example, the display apparatus 100 receives input of n, w, $f_{ij}(C)$, or the like and converts into a parameter j-excluded function $f_i(C)$.

At main function operation (S360), the display apparatus 100 receives input of n, $d_i$ and $f_i(C)$ and finally outputs f(C).

Since [$f(C)C^d$ mod n], the display apparatus 100 may deduce a plaintext M=f(C) at this operation.

According to the above processes, security of the secret key used to decrypt the plaintext may be improved.

Although the RSA algorithm is described above, the ECC algorithm may also be used in an exemplary embodiment.

That is, in the ECC algorithm, considering that the server 200 generates ciphertexts by C1=r*P and C2=M+r*Q and the display apparatus 100 decrypts the ciphertexts to a plaintext by M=C2−d*C1 (refer to FIG. 3), a secret key d is broken down into a plurality of polynomial functions and a random added element is added to each of the polynomial functions, thereby improving security of the secret key.

Here, when adding the random added element, a random coordinate on an elliptic curve is selected as the added element, wherein each added element is provided to be offset into an identity element in decryption.

Figure 5:
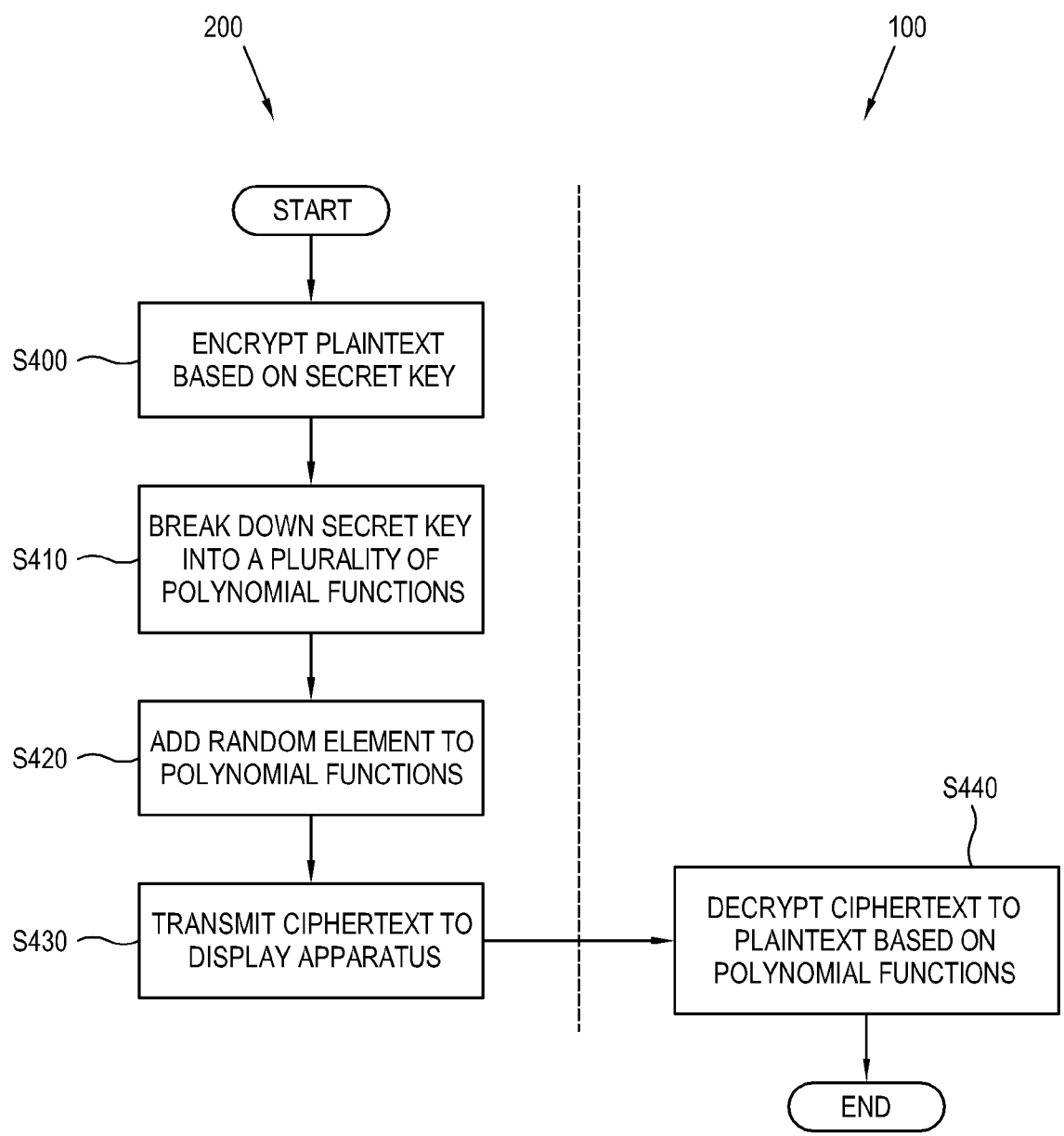
FIG. 5 is a flowchart illustrating an encrypting and decrypting method according to an exemplary embodiment.

Hereinafter, an encryption and decryption method according to an exemplary embodiment is described with reference to FIG. 5. FIG. 5 is a flowchart illustrating the method.

As shown in FIG. 5, the server 200 converts a plaintext into a ciphertext based on a secret key (S400). The server 200 breaks down the secret key into a plurality of polynomial functions (S410) and adds an element selected at random to each of the polynomial functions (S420). Then, the server 200 transmits the ciphertext to the display apparatus 100 (S430).

The display apparatus 100 pre-stores the plurality of polynomial functions employed for the server 200 generating the ciphertext and decrypts the ciphertext to the plaintext based on the polynomial functions (S440). According to an exemplary embodiment, exposure of the secret key by a white-box attack in decryption may be prevented.

The foregoing exemplary embodiments and advantages are merely exemplary and are not to be construed as limiting. Although a few exemplary embodiments have been shown and described, it will be appreciated by those skilled in the art that changes may be made in exemplary embodiments without departing from the principles and spirit of the invention. The present teaching can be readily applied to other types of apparatuses. The description of exemplary embodiments is intended to be illustrative, and not to limit the scope of the claims, and many alternatives, modifications, and variations will be apparent to those skilled in the art.

What is claimed is:

1. A method of decrypting a ciphertext, the method comprising:

pre-storing a plurality of polynomial functions by a display apparatus, the plurality of polynomial functions into which a secret key for decrypting a ciphertext to a plaintext according to a public-key cryptography algorithm is broken down;

receiving, by the display apparatus, the ciphertext generated based on the secret key which is broken down into the plurality of polynomial functions, from a ciphertext generating device; and decrypting, by the display apparatus, the received ciphertext into the plaintext based on the pre-stored polynomial functions, wherein the decrypting the received ciphertext into the plaintext comprises processing the polynomial functions, and decrypting the ciphertext into the plaintext based on the processed polynomial functions, wherein an element selected at random is added to each of the polynomial functions broken down in the ciphertext generating device, and the added elements to each of the polynomial functions are determined such that the elements are offset by multiplication of the broken down polynomial functions in a decryption apparatus to calculate an identity element.

2. The method of claim 1, wherein the processing the polynomial functions comprises:

multiplying the polynomial functions.

3. The method of claim 1, wherein the polynomial functions are broken down to the polynomial functions having a constant.

4. The method of claim 1, wherein the public-key cryptography algorithm conforms to a Rivest-Shamir-Adleman (RSA) or Elliptic Curve Cryptosystem (ECC) system.

5. A decryption apparatus for decrypting a ciphertext, the apparatus comprising:

a communication unit which communicates with a ciphertext generating device; and a processor which pre-stores a plurality of polynomial functions into which a secret key for decrypting a ciphertext to a plaintext according to a public-key cryptography algorithm is broken down, and decrypts the ciphertext into the plaintext based on the pre-stored polynomial functions when receiving the ciphertext generated based on the secret key which is broken down into the plurality of polynomial functions from the ciphertext generating device through the communication unit, wherein the processor processes the polynomial functions and decrypts the ciphertext into the plaintext based on the processed polynomial functions, wherein an element selected at random is added to each of the polynomial functions broken down in the ciphertext generating device, and the added elements to each of the polynomial functions are determined such that the elements are offset by multiplication of the broken down polynomial functions in the decryption apparatus to calculate an identity element.

6. The decryption apparatus of claim 5, wherein the processor multiplies the polynomial functions and decrypts the ciphertext into the plaintext based on the multiplied polynomial functions.

7. The decryption apparatus of claim 5, wherein the polynomial functions are broken down to the polynomial functions having a constant.

8. The decryption apparatus of claim 5, wherein the public-key cryptography algorithm conforms to a Rivest-Shamir-Adleman (RSA) or Elliptic Curve Cryptosystem (ECC) system.

9. The decryption apparatus of claim 5, wherein the ciphertext generating device comprises a server, and the decryption apparatus comprises an image processor communicating with the server.

10. A method comprising:

breaking down a secret key, which is used for decrypting a ciphertext into a plaintext according to a public-key cryptography algorithm, into polynomial functions, by a first hardware device;

encrypting, by the first hardware device, the plaintext into the ciphertext by using the polynomial functions and transmitting the ciphertext to a second hardware device;

receiving, by the second hardware device, the ciphertext generated by using the polynomial functions; and decrypting, by the second hardware device, the received ciphertext into an original plaintext by using the polynomial functions which are accessed by the second hardware device, adding random elements to each corresponding polynomial function, by the first hardware device, wherein the added random elements are determined such that the added random elements are offset by processing of the broken down polynomial functions in the second hardware device, to calculate an identity element.

11. The method of claim 10, wherein the identity element is equal to 1.

12. The method of claim 10, wherein the public-key cryptography algorithm comprises one of a Rivest-Shamir-Adleman (RSA) and an Elliptic Curve Cryptosystem (ECC) system.

13. The method of claim 10, wherein the first hardware device comprises a server and the second hardware device comprises an image processing apparatus.

14. The method of claim 1, wherein when the element selected at random is added to each of the polynomial functions, a hash function of the cipher text is utilized.

15. The method of claim 1, wherein the decrypting the received ciphertext into the plaintext comprises applying the ciphertext to a hash function.

* * * * *